(12) United States Patent
Hsu et al.

(10) Patent No.: US 12,229,037 B2
(45) Date of Patent: *Feb. 18, 2025

(54) METHODS AND SYSTEMS FOR STATUS DETERMINATION

(71) Applicant: Comcast Cable Communications Management, LLC, Philadelphia, PA (US)

(72) Inventors: Chun Hsu, Issaquah, WA (US); Michael Horwitz, Seattle, WA (US); Chris Orogvany, Seattle, WA (US); Alfred Stappenbeck, Edmonds, WA (US)

(73) Assignee: Comcast Cable Communications Management, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/480,163

(22) Filed: Oct. 3, 2023

(65) Prior Publication Data

US 2024/0126673 A1 Apr. 18, 2024

Related U.S. Application Data

(63) Continuation of application No. 16/775,003, filed on Jan. 28, 2020, now Pat. No. 11,822,453, which is a
(Continued)

(51) Int. Cl.
*G06F 11/34* (2006.01)
*G06F 9/50* (2006.01)
*G06F 11/07* (2006.01)
*G06F 11/30* (2006.01)
*H04L 67/10* (2022.01)
(Continued)

(52) U.S. Cl.
CPC ........ *G06F 11/3433* (2013.01); *G06F 9/5083* (2013.01); *G06F 11/3055* (2013.01); *H04L 67/10* (2013.01); *H04L 67/1029* (2013.01); *H04L 67/1034* (2013.01); *H04L 69/40* (2013.01); *G06F 11/076* (2013.01); *G06F 2201/81* (2013.01); *G06F 2201/875* (2013.01)

(58) Field of Classification Search
CPC .............. G06F 11/3433; G06F 9/5083; G06F 11/3055; G06F 11/076; G06F 2201/81; G06F 2201/875; H04L 67/10; H04L 67/1029; H04L 67/1034; H04L 67/40
See application file for complete search history.

(56) References Cited

U.S. PATENT DOCUMENTS 5,109,486 A 4/1992 Seymour
5,909,217 A 6/1999 Bereiter
(Continued)

OTHER PUBLICATIONS

Schneidewind, System Network, 2012 (Year: 2012).*
(Continued)

*Primary Examiner* — Mohamed Charioui
*Assistant Examiner* — Dacthang P Ngo
(74) *Attorney, Agent, or Firm* — Ballard Spahr LLP

(57) ABSTRACT

Methods and systems for status determination are disclosed. A computing device may determine a status of the computing device or another computing device. One or more actions may be taken based on the status of the computing device or the another computing device.

20 Claims, 6 Drawing Sheets

Related U.S. Application Data continuation of application No. 14/546,418, filed on Nov. 18, 2014, now Pat. No. 10,592,379.

(51) Int. Cl.
*H04L 67/1029* (2022.01)
*H04L 67/1034* (2022.01)
*H04L 69/40* (2022.01)

(56) References Cited

U.S. PATENT DOCUMENTS

| | | |
|---|---|---|
| 9,344,493 B1 | 5/2016 | Anand |
| 9,378,068 B2 | 6/2016 | Anantharam et al. |
| 9,813,341 B1 | 11/2017 | Tailor et al. |
| 10,592,379 B2 | 3/2020 | Hsu et al. |
| 2007/0025381 A1 | 2/2007 | Feng et al. |
| 2014/0280949 A1* | 9/2014 | Anantharam ......... H04L 47/822 709/226 |
| 2015/0207754 A1* | 7/2015 | Johnson ................. G06F 9/505 709/226 |
| 2015/0223095 A1* | 8/2015 | Centonza ............... H04B 17/24 455/67.11 |
| 2016/0140012 A1 | 5/2016 | Hsu et al. |
| 2016/0309345 A1 | 10/2016 | Tehrani et al. |

OTHER PUBLICATIONS

Stoica, Chord: A Scalable Peertopeer Lookup Service for Internet Applications, 2001 (Year: 2001).*
Zaki, M.J. et al., "Customized Dynamic Load Balancing for a Network of Workstations," Comp Sci Dept, Univ. Rochester, Rochester, NY (1996) (10 pages).
Willebeek-Lemair, M.H., "Strategies for Dynamic Load Balancing on Highly Parallel Computers," IEEE Transactions on Parallel and Distributed Systems, 1993, vol. 4, No. 9, pp. 979-993.
Rao, A. et al., "Load Balancing in Structured P2P Systems," 2003, 6 pages.

* cited by examiner

METHODS AND SYSTEMS FOR STATUS DETERMINATION

CROSS REFERENCE TO RELATED APPLICATION

This application is a continuation of U.S. application Ser. No. 16/775,003 filed Jan. 28, 2020, which is a continuation of U.S. application Ser. No. 14/546,418, filed Nov. 18, 2014, issued as U.S. Pat. No. 10,592,379, all of which are herein incorporated by reference in their entirety.

BACKGROUND

Current performance status determinations, for example, load balance checks, often do not account for partial failures. A performance status of a node with a 90% failure rate can still be considered alive or active. Moreover, a performance status of a specific node in a system is often determined based on the performance rate of that node alone, without considering the performance rates of other nodes in the system. These and other shortcomings are addressed in the present disclosure.

SUMMARY

It is to be understood that both the following summary and the following detailed description are exemplary and explanatory only and are not restrictive, as claimed. Methods and systems for status determination are disclosed. Operational status of a node can be considered based on operational rates of a plurality of nodes in a system. Standards for determining performance status can change dynamically based on a comparison of the operational rates of a plurality of nodes in the system. The systems and methods provided herein allow the determination and reporting of a device's status based on a comparison of the devices operational rate (e.g., failure rate, success rate) to the operational rate of other devices. For example, nodes in a load balancing system can determine the node's status based by comparing operational rates. For example, a first node can experience a 90% failure rate. Through communication with other nodes, the first node can determine that other nodes are experiencing a failure rate between 0% and 10%. Relative to the other nodes, the first node is experiencing a high failure rate. Therefore, the first node can report back to the network load balancer a status indicating unavailability.

In an aspect, a first operational rate of a first node and a second operational rate of a second node can be determined and compared with each oter. An operational status (e.g., live, not live) can be determined based on the comparison (e.g., difference between the two operational rates). The operational status of the first node can be sent to another node and/or load balancer.

In another aspect, operational rates can be received from a plurality of nodes and used to determine an operational status of a first node. For example, the operational status of a first node can be determined based on a difference of an operational rate of the first node and operational rates of the plurality of nodes. The operational status of the first node can be sent to an internal service, remote device (e.g., load balancer), and/or the like.

In a further aspect, a device, such as a load balancer or node, can request an operational status of a first node. The operational status of the first node can be determined (e.g., by the first node) based on data indicative of an operational rate (e.g., failure rate) of a second node. The operational status can be received by the device from the first node. The device can send a request to the first node to process a task can be based on the operational status.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
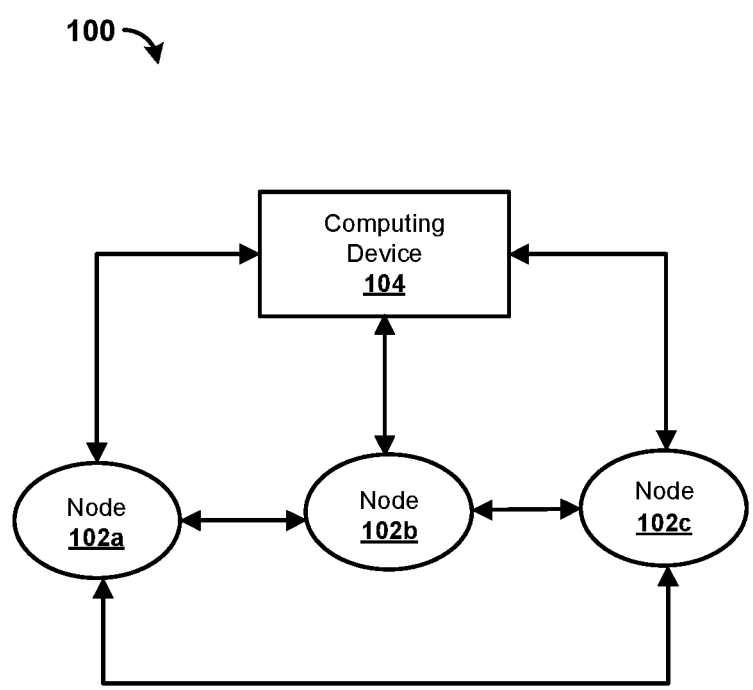
FIG. 1 is a block diagram of an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded to a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded to a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Methods and systems for status determination are disclosed. An operational status of a node can be determined based on operational rates of a plurality of nodes in a system.

A comparison of the operational rates of a plurality of nodes in a system can reveal one or more nodes that are "more" or "less" available than other nodes in the plurality of nodes for task processing. The methods and systems disclosed can utilized a relative comparison of operational rates of a plurality of nodes to establish an operational status for one or more of the plurality of nodes. Any operational rate can be applied to the present disclosure along with any technique for comparing one or more operational rates to each other to derive an operational status. For example, a first operational rate of a first node and a second operational rate of a second node can be determined. A difference between the second operational rate and the first operational rate can be determined. An operational status of the first node and/or the second node can be provided based on the difference.

FIG. 1 illustrates a block diagram of an example system 100 for determining operational statuses of nodes and performing load balancing according to the operational statuses. In an aspect, the system can comprise a plurality of nodes (e.g., node 102a, 102b, 102c). As an example, a node can comprise a server, a switch, a router, a bridge, a repeater, a communication gateway, a session border controller, a boundary device, a network interface, customer premises equipment (CPE), a headend, a cable modem termination system (CMTS) or any network device or system. The plurality of nodes (e.g., the nodes 102a, 102b, 102c) can be configured for receiving, processing, and/or forwarding information over a network or system. The plurality of nodes can communicate with each other. In an aspect, one or more of the plurality of nodes (e.g., the node 102a) can receive operation information (e.g., operational rates) associated with the remaining nodes of the plurality of nodes (e.g., the node 102b, the node 102c). In another aspect, one or more of the plurality of nodes can determine its operational status by processing (e.g., comparing) its operation information (e.g., operational rate) with the operation information (e.g., operational rate) of at least one of the remaining plurality of nodes. For example, operational rates can comprise a rate of failing to fulfill requests, a CPU utilization rate, an average response time, transactions per second, a RAM utilization rate, disk space, total communication sessions in processing, a failure rate (e.g., rate for failing to fulfill requests), an error rate (e.g., Layer 2 error rate, Layer 3 error rate), a combination thereof, and the like. Other operational rates can be included according to a specific network or system. As another example, the operational status can comprise active or inactive, or available or not available.

In an aspect, the system 100 can comprise a computing device 104. The computing device 104 can comprise a network device and/or system configured for communicating with one or more of the plurality of nodes and/or one or more other network devices. In an aspect, the computing device 104 can be configured to request operation information (e.g., operational rates) from one or more of the plurality of nodes (e.g., the nodes 102a, 102b, 102c). In an aspect, the computing device 104 can be configured to determine an operational status (e.g., active, inactive) of one or more of the plurality of nodes based on the operation information (e.g., operational rates) of the one or more of the plurality of nodes.

In an aspect, the computing device 104 can comprise a load balancer. The computing device 104 (e.g., a load balancer) can transmit a request (e.g., an operational status check) to a node (e.g., the node 102a). The node (e.g., the node 102a) can request operational rates of one or more peer nodes (e.g., the node 102b, the node 102c). The node 102a can determine its operational status based on a difference of its operational rate and the operational rates of the one or more peer nodes (e.g., the node 102*b*, the node 102*c*). The node 102*a* can provide its operational status to the computing device 104 (e.g., the load balancer). The computing device 104 can provide the operational status of the node 102*a* to a task assignment system. Based on the operational status of the node 102*a*, the task assignment system can transmit a request to the node 102*a* to fulfill a task (e.g., routing a data block). The request can be processed at the node 102*a*. In another aspect, the task assignment system can transmit a request to another node to fulfill the task in the event the operational status of the node 102*a* is unsuitable for the task.

In an aspect, the communications between components of the system 100 can comprise a private and/or public network, such as the Internet, a local area (LAN) network, metropolitan area network (MAN), a wide area network (WAN), a public land mobile network (PLMN), a public switched telephone network (PSTN), a wireless distribution network, a wired or cable distribution network, a coaxial cable distribution network, an ultra-high frequency (UHF) or very high frequency (VHF) radio frequency network, a satellite or other extra-terrestrial network, a cellular distribution network, a power-line broadcast network, a fiber optic network, or any combinations of these systems and/or networks. In an aspect, the computing device 104 and one or more of the plurality of nodes (e.g., the node 102*a*, the node 102*b*, the node 102*c*) can be implemented as separate network entities or reside in a common location. In the latter case, the communication in the common location can be performed by way of internal functionality.

In an aspect, the communications between components (e.g., the computing device 104, the node 102*a*, the node 102*b*, the node 102*c*) of the system 100 can utilize one or more of hypertext transfer protocol (HTTP), Transmission Control Protocol (TCP), Internet Protocol (IP), File Transfer Protocol (FTP), Telnet, Hypertext Transfer Protocol Secure (HTTPS), Session Initiation Protocol (SIP), Simple Object Access Protocol (SOAP), Extensible Mark-up Language (XML) and variations thereof, Simple Mail Transfer Protocol (SMTP), Real-Time Transport Protocol (RTP), User Datagram Protocol (UDP), Global System for Mobile Communications (GSM) technologies, Code Division Multiple Access (CDMA) technologies, Evolution Data Optimized Protocol (EVDO), Internet Group Management Protocol (IGMP), Real Time Streaming Protocol (RTSP), Time Division Multiple Access (TDMA) technologies, radio frequency (RF) signaling technologies, wireless communication technologies (e.g., Bluetooth, Wi-Fi, etc.) and other suitable communications technologies.

Figure 2:
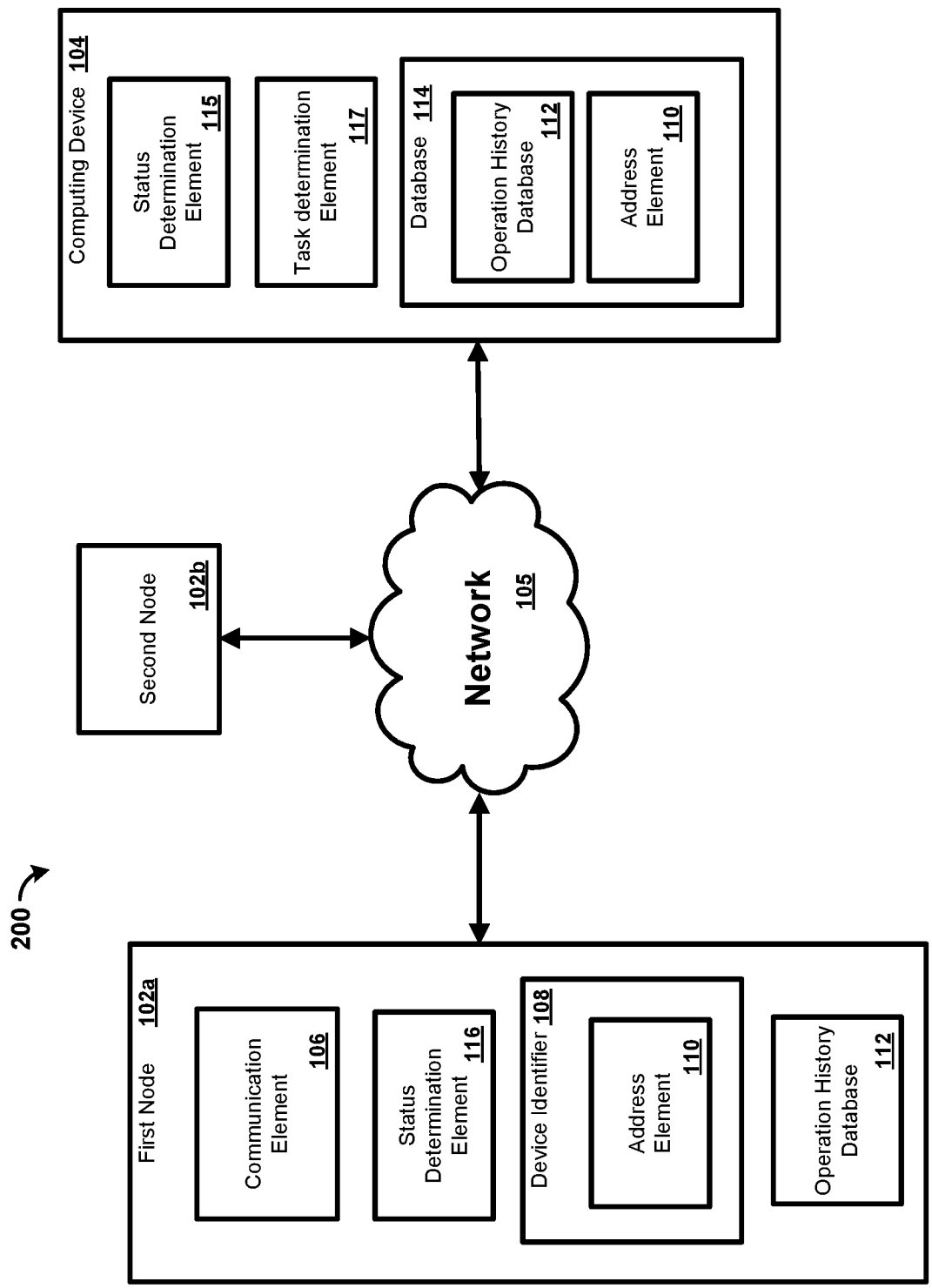
FIG. 2 is a block diagram of an exemplary system in which the present methods and systems can operate.

FIG. 2 illustrates various aspects of an exemplary environment in which the present methods and systems can operate. In one aspect of the disclosure, the system can be configured to provide services such as network-related services to a user device. The present disclosure is relevant to systems and methods for providing services to a device, for example, a user device such as a computer, tablet, mobile device, communications terminal, or the like. In an aspect, one or more network devices can be configured to provide various services to one or more devices, such as devices located at or near a premises. In another aspect, the network devices can be configured to recognize an authoritative device for the premises and/or a particular service or services available at the premises. As an example, an authoritative device can be configured to govern or enable connectivity to a network such as the Internet or other remote resources, provide address and/or configuration services like DHCP, and/or provide naming service or discovery services for a premises, or a combination thereof. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The system 200 can comprise a plurality of nodes (e.g., a first node 102*a*, a second node 102*b*) in communication with a computing device 104, for example, a load balancer. The computing device 104 can be disposed locally or remotely relative to the first node 102*a* and/or the second node 102*b*. As an example, the plurality of nodes (e.g., the first node 102*a*, the second node 102*b*) and the computing device 104 can be in communication via a private and/or public network 105 such as the Internet or a local area network. Other forms of communications can be used such as wired and wireless telecommunication channels. As an example, one or more of a plurality of nodes (e.g., the first node 102*a*, the second node 102*b*) can comprise a server, a switch, a router, a bridge, a repeater, a communication gateway, a session border controller, a boundary device, a network interface, customer premises equipment (CPE), a headend, a cable modem termination system (CMTS) or any network device or system capable of communicating with the computing device 104.

In an aspect, each of the plurality of nodes (e.g., the first node 102*a*, the second node 102*b*) can comprise a respective communication element (e.g., communication element 106) for providing an interface for a user to interact with the one or more of the plurality of nodes (e.g., the first node 102*a*, the second node 102*b*), and/or the computing device 104. The communication element 106 can be any interface for presenting and/or receiving information to/from a user or another device. As an example, the communication element 106 can request or query various files from a local source and/or a remote source. In an aspect, the communication element 106 can transmit data to a local or remote device such as the computing device 104. As an example, the data can comprise operational status, operational rate, and other information.

In an aspect, each of the plurality of nodes (e.g., the first node 102*a*, the second node 102*b*) can be associated with a respective user identifier or device identifier 108. As an example, the device identifier 108 can be any identifier, token, character, string, or the like, for differentiating one node from another node. In a further aspect, the device identifier 108 can identify a node as belonging to a particular class of device. As a further example, the device identifier 108 can comprise information relating to a respective node such as a manufacturer, a model or type of device, a service provider associated with a respective node (e.g., first node 102*a*), a state of a respective node (e.g., the first node 102*a*), a locator, and/or a label or classifier. Other information can be represented by the device identifier 108. As an example, the device identifier 108 can be transmitted if/when the first node 102*a* transmits data (e.g., operational rates, operational status) from the first node 102*a* to the second node 102*b* and/or the computing device 104.

In an aspect, the device identifier 108 can comprise an address element 110. In an aspect, the address element 110 can comprise or provide an internet protocol address, a network address, a media access control (MAC) address, an Internet address, or the like. As an example, the address element 110 can be relied upon to establish a communication session between the first node 102a, the second node 102b, the computing device 104, and/or other devices and/or networks. As a further example, the address element 110 can be used as an identifier or locator of a respective node (e.g., the first node 102a). In an aspect, the address element 110 can be persistent for a particular network. As an example, the address element 110 of the first node 102a can be transmitted if/when the first node 102a transmits data (e.g., operational rates, operational status) to the second node 102b, the computing device 104, and/or other network devices.

In an aspect, each of the plurality of nodes (e.g., the first node 102a, the second node 102b) can be associated with a respective status determination element (e.g., a status determination element 116 associated with the first node 102a). For example, the first node 102a can determine an operational rate (e.g., first operational rate) of the first node 102a. The first node 102a can request operational rates from a plurality of peer nodes. For example, the first node 102a can request an operational rate of the second node 102b (e.g., second operational rate). The status determination element 116 can be configured to compare the first operational rate and the second operational rate and determine an operational status of the first node 102a based on the comparison. Similarly, a status determination element (not shown) associated with the second node 102b can be configured to determine an operational status of the second node 102b based on a comparison between the first operational rate and the second operational rate.

In an aspect, each of the plurality of nodes (e.g., the first node 102a, the second node 102b) can be associated with a respective operational history database (e.g., an operational history database 112 associated with the first node 102). As an example, an operational history database can comprise operational rates and/or operational status at a plurality of historical time points. For example, operational rates can comprise a rate of failing to fulfill requests, a CPU utilization rate, an average response time, transactions per second, a RAM utilization rate, disk space, total communication sessions in processing, a failure rate (e.g., rate for failing to fulfill requests), an error rate (e.g., Layer 2 error rate, Layer 3 error rate), combinations thereof, and the like. Other operational rates can be included according to a specific network or system. As another example, the operational status can comprise active or inactive, or available or not available. In an aspect, the information stored in an operational history database can be updated periodically (e.g., every minute, every five minutes, etc.). In an aspect, each of the plurality of nodes can be associated with a respective operational history database. An operational history database can be internal or external to a respective plurality of nodes. In another aspect, the plurality of nodes can be associated with the same operational history database.

In an aspect, the computing device 104 can be a server for communicating with the plurality of nodes (e.g., the first node 102a, the second node 102b). As an example, the computing device 104 can communicate with the plurality of nodes (e.g., the first node 102a, the second node 102b) for providing data and/or services. As an example, the computing device 104 can provide an operational status monitoring service, or other network-related service(s). In an aspect, the computing device 104 can allow the plurality of nodes (e.g., the first node 102a, the second node 102b) to interact with remote resources such as data, devices, and files. As an example, the computing device 104 can be configured as (or disposed at) a central location (e.g., a headend, or processing facility), which can receive information (e.g., operational status, operational rates) from multiple sources (e.g., a plurality of nodes). The computing device 104 can combine the information (e.g., operational status, operational rates) from the multiple sources.

In an aspect, the computing device 104 can comprise a status determination element 115. As an example, the computing device 104 can receive operational rates from a plurality of nodes (e.g., the first node 102a, the second node 102b). For example, the computing device 104 can be configured to receive the first operational rate from the first node (e.g., the first node 102a) and to receive the second operational rate from the second node (e.g., the second node 102b). The status determination element 115 can determine an operational status of the plurality of nodes (e.g., the first node 102a, the second node 102b) based on a difference of one or more operational rates of the plurality of nodes. In an aspect, an operational rate of a node can comprise a rate indicative of the operation of the node, such as a success rate (e.g., a rate indicative of successful operation) or a failure rate (e.g., a rate indicative of failed operation). As an example, the operational rate (e.g., failure rate) of the first node 102a can be 90% and the operational rate (e.g., failure rate) of the second node 102b can be 10%. A comparison of these values can determine that operational status of the first node is, for example, inactive or unavailable, whereas the operational status of the second node is, for example, active or available.

In an aspect, the computing device 104 can comprise a task assignment element 117. The task assignment element 117 can determine a task to assign to the first node 102a based on the operational status of the first node 102a. For example, if the operational status of the first node 102a is active or available, the task assignment element 117 can request that the first node 102a fulfill a task (e.g., route a specific data block). In an aspect, the computing device 104 can transmit the request to fulfill the task to the first node 102a based on the device identifier 108 and/or address element 110 of the first node 102a.

In an aspect, the computing device 104 can manage communication between the first node 102a and a database 114 for sending and receiving data therebetween. As an example, the database 114 can store a plurality of files (e.g., web pages), user identifiers or records, or other information. As a further example, the first node 102a can request and/or retrieve a file from the database 114. In an aspect, the database 114 can store information relating to the first node 102a such as the address element 110. As an example, the computing device 104 can obtain the device identifier 108 from the first node 102a and retrieve information from the database 114 such as the address element 110. Any information can be stored in and retrieved from the database 114. For example, the operational history database 112 can be integrated with the database 114. The database 114 can be disposed remotely from the computing device 104 and accessed via direct or indirect connection. The database 114 can be integrated with the computing device 104 or some other device or system.

Figure 3:
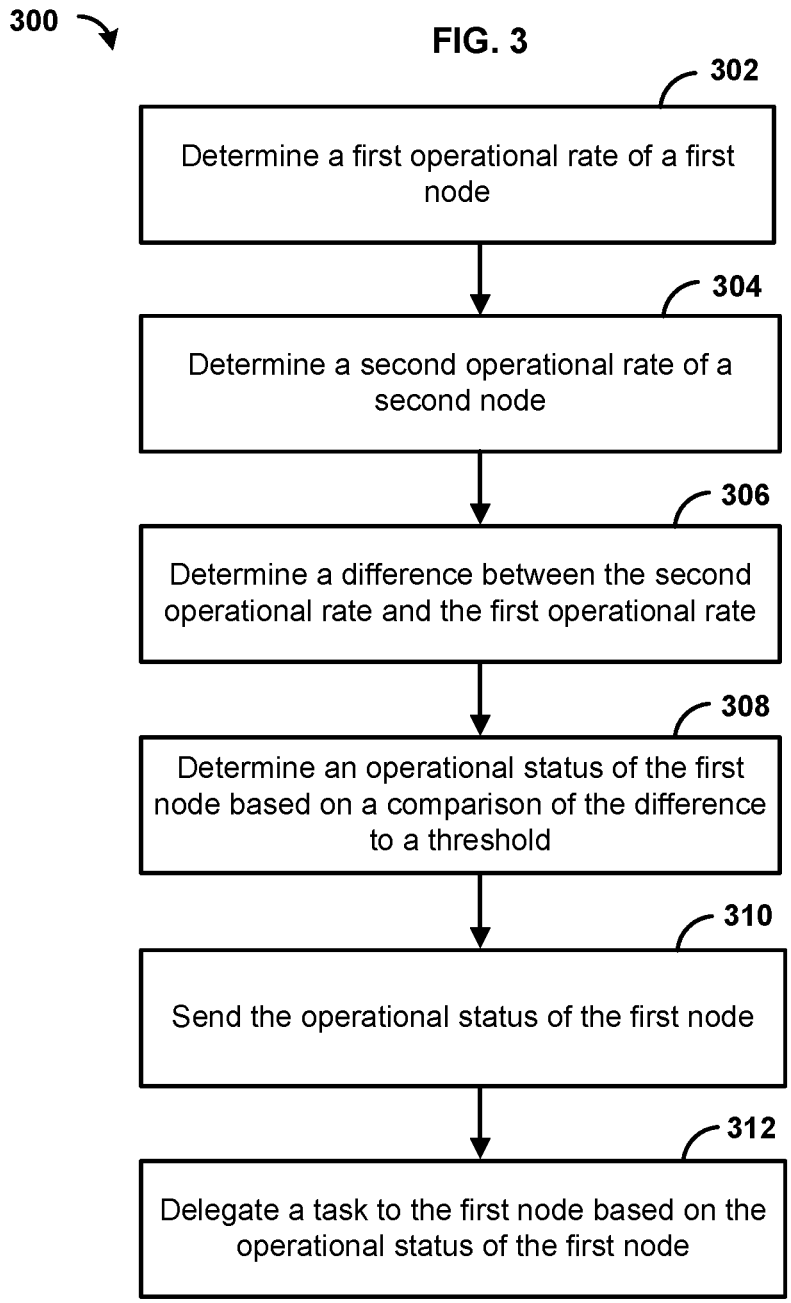
FIG. 3 is a flowchart illustrating an example method.

FIG. 3 is a flowchart illustrating an example method 300. At step 302, a first operational rate of a first node can be determined. The first operational rate can comprise a success rate of the first nodes, a failure rate of the first node, a combination thereof, and/or the like. In an aspect, the first node (e.g., the node 102a) can determine its operational rate upon receiving a request for an operational status of the first node from a load balancer (e.g., computing device 104). In an aspect, the first operational rate can comprise information associated with the first node, for example, a CPU utilization rate, an average response time, transactions per second, a RAM utilization rate, disk space, total communication sessions in processing, a failure rate (e.g., rate for failing to fulfill requests), success rates (e.g., rate of fulfilling requests), an error rate (e.g., Layer 2 error rate, Layer 3 error rate), combinations thereof, and the like. Other operational rates can be used according to a specific network or system. In an aspect, determining the first operational rate can comprise accessing an operational history database. For example, the operational history database can comprise information on the operational rates associated with the first nodes and associated time point. The operational history database can be updated periodically (e.g., every minute, every five minutes, etc.) to obtain the most recent operational rates associated with the first node.

At step 304, a second operational rate of a second node can be determined. The second operational rate can comprise a success rate of the second node, a failure rate of the second node, a combination thereof, and/or the like. In an aspect, the second node (e.g., the node 102b) can be a peer of the first node in a load balancing system. The second operational rate can be determined at the second node. In an aspect, the second operational rate can comprise information associated with the second node such as a CPU utilization rate, an average response time, transactions per second, a RAM utilization rate, disk space, total communication sessions in processing, a failure rate (e.g., rate for failing to fulfill requests), an error rate (e.g., Layer 2 error rate, Layer 3 error rate), combinations thereof, and the like. Other operational rates can be used according to a specific network or system. In an aspect, determining the second operational rate can comprise accessing an operational history database. For example, the operational history database associated with the second node can store information on the operational rates of the second nodes and associated time point. The operational history database can be updated periodically (e.g., every minute, every five minutes, etc.) to obtain the most recent operational rates associated with the second node.

At step 306, a difference between the first operational rate and the second operational rate can be determined. In an aspect, the second operational rate can be transmitted to the first node to facilitate the determination of the operational status of the first node. By way of example, a difference in operational rates (e.g., rate for failing to fulfill requests, success rate) between the first node and the second node can be determined. As a specific example, the operational rate of the first node can be 90% and the operational rate of the second node can be 10%. A comparison of these values can determine that the operational status of the first node is, for example, inactive or unavailable, whereas the operational status of the second node is, for example, active or available. Other techniques for determining a difference in operational status are specifically contemplated herein and can vary based on the operational rates (or other data) considered in the determination.

In an aspect, the operational status can be determined based on a comparison of the difference to a threshold value. For example, the difference of the first operational rate (e.g., 90% failure rate) and the second operational rate (e.g., 10% failure rate) can be 80%. If the threshold value is set to be 50%, the difference can be above the threshold value. The operational status can indicate that the first node is not available to receive requests. If, by contrast, the difference of the first operational rate (e.g., 30%) and the second operational rate (e.g., 10%) is below a threshold value (e.g., 50%), the operational status can indicate that the first node is available to receive requests.

At step 308, an operational status of the first node can be determined. For example, the operational status can be determined based on a comparison of the difference to a threshold. The threshold can be any appropriate value, such as any number between 0 and 100 (e.g., 10, 20, 30, 40, 50, 70), and/or the like. The operational status can have a first value if the difference is less than the threshold or a second value if the difference is greater than the threshold. The first value can be opposite the second value. The first value can be indicative of availability (e.g., for processing tasks). The second value can be indicative of unavailability (e.g., for processing tasks). For example, the first value can comprise a numerical value (e.g., 1), a Boolean value, (e.g., true), a text value (e.g., live, available, enabled, active), and/or the like. The second value can comprise a numerical value (e.g., 0), Boolean value (e.g., false), a text value (e.g., not live, unavailable, disabled, inactive), and/or the like. For example, the operational status can be selected for a device, such as a load balancer, which is configured to recognize only the first value or the second value as an operational status.

At step 310, the operational status of the first node can be sent, provided, transmitted, and/or the like. In an aspect, the operational status of the first node can be provided to a load balancer or another system or node that requests the operational status of the first node. In an aspect, the device identifier 108 and/or the address element 110 of the first node can be included if/when the operational status of the first node is provided to the load balancer.

At step 312, a task can be delegated to the first node based on the operational status of the first node. In an aspect, a task can be delegated to the first node based on the operational status of the first node. For example, a task assignment system or the task assignment element 117 associated with the load balancer (e.g., the computing device 104) can determine a task based on the status of the first node. A request to fulfill a task can be transmitted from the load balancer to the first node. As an example, the request to fulfill a task can comprise routing one or more data blocks. The request can be processed at the first node. In another aspect, the first node can be identified as a node that cannot receive further tasks until the operational status of the first node changes.

Figure 4:
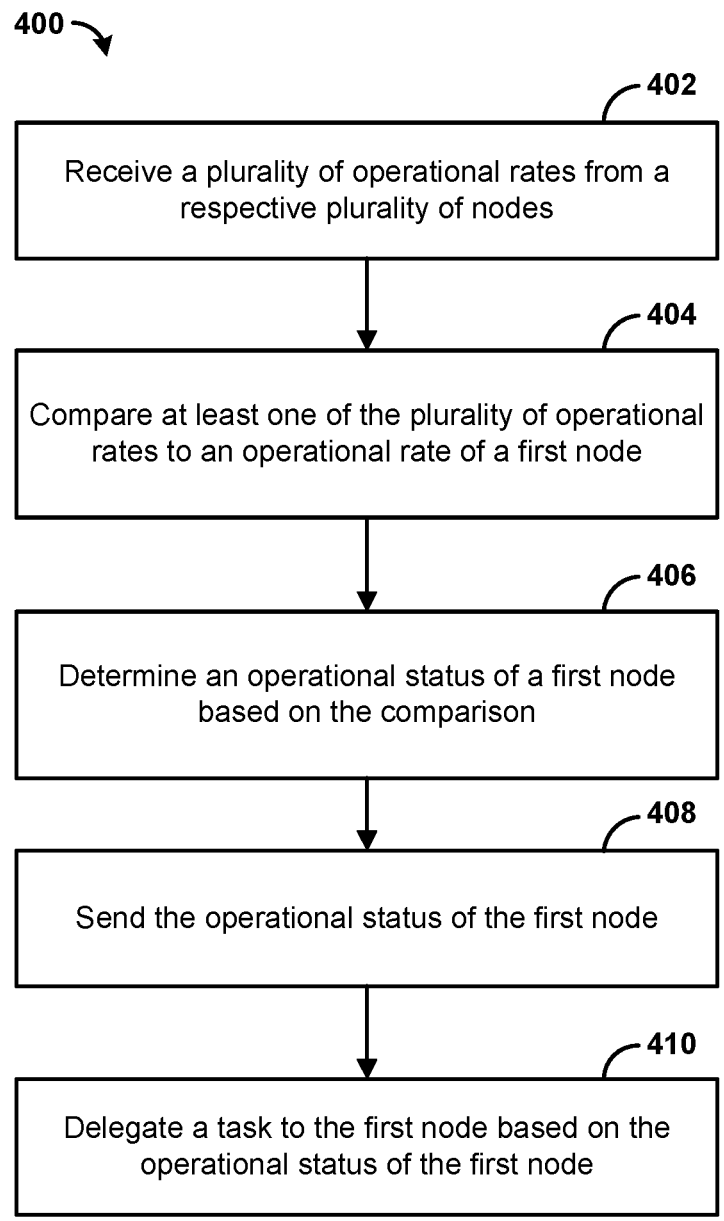
FIG. 4 is a flowchart illustrating an example method.

FIG. 4 is a flowchart illustrating an example method 400. At step 402, operational rates can be received (e.g., at a first node) from a plurality of second nodes. The plurality of operational rates can comprise respective success rates of the second nodes, respective failure rates of the second nodes, a combination thereof, and/or the like. As an example, a plurality of second nodes (e.g., the nodes 102a, 102b, and 102c) can transmit respective operational rates to the computing device 104 (e.g., a load balancer, first node). In an aspect, the operational rates can comprise information such as a CPU utilization rate, an average response time, transactions per second, a RAM utilization rate, disk space, total communication sessions in processing, a failure rate (e.g., rate for failing to fulfill requests), success rates (e.g., rate of fulfilling requests), an error rate (e.g., Layer 2 error rate, Layer 3 error rate), combinations thereof, and/or the like. Other operational rates can be used according to a specific network or system. In an aspect, the operational rates can be accessed via an operational history database (e.g., the operational history database 112) associated with the respective plurality of second nodes.

At step 404, at least one of the plurality of operational rates can be compared (e.g., at the first node) to an operational rate of the first node. For example, a difference can be determined between the operational rate of the first node and at least one of the operational rates of the plurality of second nodes. As another example, comparing at least one of the plurality of operational rates to the operational rate of the first node can comprise comparing the operational rate of the first node to an average of one or more of the operational rates of the plurality of second nodes.

At step 406, an operational status of a first node can be determined. The operational status of the first node can be determined based on the comparison of step 404. For example, the operational status can be determined based on a difference, comparison, and/or the like between an operational rate of the first node and at least one of the operational rates of the plurality of second nodes. The operational status can be determined based on the difference, comparison, and/or the like between the average of the one or more operational rates of the plurality of second nodes and the operational rate of the first node. In an aspect, the first node (e.g., the node 102a) can be one of the plurality of second nodes (e.g., the node 102b, the node 102c). In another aspect, the first node can be a peer node to the one of the plurality of second nodes (e.g., the node 102a, the node 102b, the node 102c, etc.).

For example, the operational status can be determined based on a comparison of a difference (e.g., difference between the average and the operational rate of the first node, difference between the operational rate of the first node and at least one operational rate of the second nodes) to a threshold (e.g., or multiple thresholds). The threshold can be any appropriate value, such as any number between 0 and 100 (e.g., 10, 20, 30, 40, 50, 70), and/or the like. The operational status can have a first value if the difference is less than the threshold or a second value if the difference is greater than the threshold. The first value can be opposite the second value. The first value can be indicative of availability (e.g., for processing tasks). The second value can be indicative of unavailability (e.g., for processing tasks). For example, the first value can comprise a numerical value (e.g., 1), a Boolean value, (e.g., true), a text value (e.g., live, available, enabled, active), and/or the like. The second value can comprise a numerical value (e.g., 0), Boolean value (e.g., false), a text value (e.g., not live, unavailable, disabled, inactive), and/or the like. For example, the operational status can be selected for a device, such as a load balancer, which is configured to recognize only the first value or the second value as an operational status.

In an aspect, the computing device 104 (e.g., the status determination element 115) can receive the various operational rates and can determine the difference between the operational rate of the first node and the operational rates of the plurality second nodes. For example, a difference in operational rates (e.g., failure rates, success rates) between the operational rate of the first node (e.g., the node 102a) and the operational rates of the plurality of second nodes (e.g., the node 102b, the node 102c) can be determined. As a specific example, the operational rate of the first node can be 90% and the operational rates of the plurality of second nodes (e.g., the node 102b, the node 102c) can be 10% and 30% respectively. The computing device 104 (e.g., the status determination element 115) can determine that the operational status of the first node is inactive based on a comparison of the operational rate of the first node (e.g., 90%) with the operational rates of the plurality of second nodes (e.g., 10%, 30%). In an aspect, the operational status can be determined based on a comparison of the difference to a threshold value. For example, the difference of the first operational rate of the first node (e.g., 90% failure rate) and one or more of the operational rates of the plurality of second nodes (e.g., 10%, 30%) can be 80% and 60% respectively. If the threshold value is set to be 50%, the difference of the first operational rate and one or more of the plurality of second nodes would be above the threshold value. In such an event, the computing device 104 (e.g., the status determination element 115) can indicate that the first node is not available to receive requests. As another example, the difference of the first operational rate of the first node (e.g., 10% failure rate) and one or more of the operational rates of the plurality of second nodes (e.g., 10%, 30%) can be 0% and 20% respectively. If the threshold value is set to be 50%, the difference of the first operational rate and the operational rates of the plurality of second nodes would be below the threshold value. In such an event, the computing device 104 (e.g., the status determination element 115) can indicate that the first node is available to receive requests.

In an aspect, the threshold value can be a predefined value (e.g., 50%, 30%, etc.). In another aspect, the threshold value can be dynamically determined. For example, the threshold value can be an average value of the operational rates received from the plurality of second nodes. Specifically, if the average operational rate (e.g., failure rate) of the plurality of second nodes is 50%, and if the operational rate (e.g., 90%) of the first node is above the average operational rate, the operational status can indicate that the first node is not available to receive requests. Similarly, if the average operational rate (e.g., failure rate) is 50%, and if the operational rate (e.g., 40%) of the first node is below the average operational rate, the operational status can indicate that the first node is available to receive requests.

At step 408, the operational status of the first node can be sent, provided, transmitted and/or the like. The operational status can be sent, provided, transmitted, and/or the like in response to a request for the operational status (e.g., from a load balancer or other node). For example, the operational status can be provided in response to a status check (e.g., live check) from the load balancer or another node. In an aspect, the computing device 104 (e.g., a load balancer) can provide the operational status of the first node to a task assignment system. In another aspect, the operational status of the first node can be provided to a task assignment element (e.g., the task assignment element 117) of the computing device 104. In an aspect, the device identifier 108 and/or the address element 110 of the first node (e.g., the node 102a) can be included if/when the operational status of the first node is provided to the task assignment system.

At step 410, a task can be delegated to the first node based on the operational status of the first node. For example, the task assignment element 117 of the computing device 104 and/or the task assignment system can determine a task based on the operational status of the first node. The computing device 104 and/or the task assignment system can transmit a request to fulfill a task to the first node. As a specific example, the request to fulfill a task can comprise routing one or more data blocks. The request can be processed at the first node. In another aspect, the computing device 104 and/or the task assignment system can refrain from transmitting requests to fulfill a task to the first node in the even the first node has an operational status that is insufficient to ensure task completion.

Figure 5:
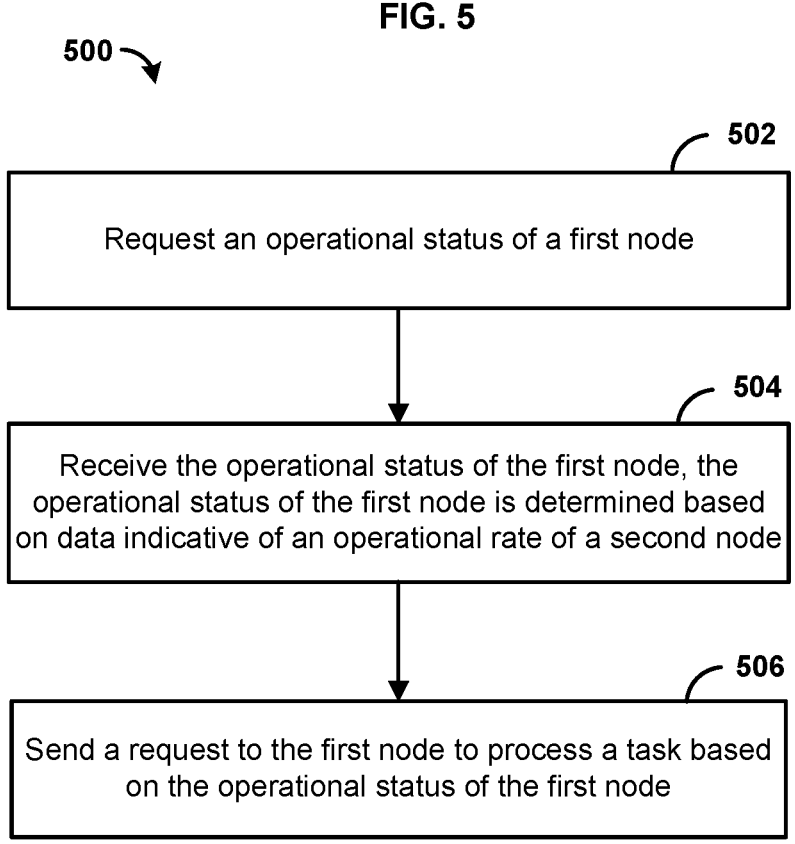
FIG. 5 is a flowchart illustrating an example method.

FIG. 5 is a flowchart illustrating an example method 500. At step 502, an operational status of a first node can be requested. For example, the operational status can be requested at a device by sending a request from the device. As an example, a load balancer can request the operational status of the first node from the first node or another node. In another aspect, a task assignment system can request the operational status of the first node. The task assignment system can request the operational status via the load balancer. In an aspect, the operational status can be selected from a plurality of values, for example, active or inactive, or available or not available.

At step 504, the operational status of the first node can be received from the first node. In an aspect, the operational status of the first node (e.g., the node 102*a*) can be determined based on data indicative of an operational rate (e.g., failure rate, success rate) of a second node. As an example, the second node can be a peer of the first node in a load balancing system. In an aspect, the data indicative of an operational rate of the second node can comprise a rate for failing to fulfill requests, an error rate (e.g., Layer 2 error rate, Layer 3 error rate), combinations thereof, and the like. Other operational rates can be used according to a specific network or system. In an aspect, data indicative of an operational rate of a second node can be accessed via an operational history database associated with the second node. For example, the operational history database associated with the second node can store data indicative of an operational rate of a second node.

In an aspect, determining the operational status of the first node can comprise determining a difference between the operational rate of the first node (e.g., the node 102*a*) and the operational rate of the second node (e.g., the node 102*b*). The operational rate of the second node can be transmitted to the first node to facilitate the determination of the operational status of the first node. For example, the operational status can be determined based on a comparison of the difference (e.g., difference between the operational rate of the first node and the operational rate of the second node) to a threshold. The threshold can be any appropriate value, such as any number between 0 and 100 (e.g., 10, 20, 30, 40, 50, 70), and/or the like. The operational status can have a first value if the difference is less than the threshold or a second value if the difference is greater than the threshold. The first value can be opposite the second value. The first value can be indicative of availability (e.g., for processing tasks). The second value can be indicative of unavailability (e.g., for processing tasks). For example, the first value can comprise a numerical value (e.g., 1), a Boolean value, (e.g., true), a text value (e.g., live, available, enabled, active), and/or the like. The second value can comprise a numerical value (e.g., 0), Boolean value (e.g., false), a text value (e.g., not live, unavailable, disabled, inactive), and/or the like. For example, the operational status can be selected for a device, such as a load balancer, which is configured to recognize only the first value or the second value as an operational status.

As a specific example, the operational rate of the first node can be 90% and the operational rate of the second node can be 10%. Accordingly, the first node can determine that the operational status of the first node is inactive (e.g., second value) based on a comparison of the operational rate of the first node (e.g., 90%) with the operational rate of the second node (e.g., 10%). In an aspect, the operational status can be determined based on a comparison of the difference to a threshold value. For example, the difference of the operational rate of the first node (e.g., 90% failure rate) and the operational rate (e.g., 10% failure rate) of the second node would be 80%. If the threshold value is set to be 50%, the difference would be above the threshold value. The operational status can indicate that the first node is not available to receive requests. If, by contrast, the difference of the operational rate of the first node (e.g., 30%) and the operational rate of the second node (e.g., 10%) is below, above, or equal to a threshold value (e.g., 50%), the operational status can indicate that the first node is available to receive requests if the difference is below the threshold value.

In an aspect, the operational status of the first node can be transmitted from the first node to the load balancer and/or the task assignment system. In an aspect, the device identifier 108 and/or the address element 110 of the first node (e.g., the node 102*a*) can be transmitted if/when the operational status of the first node is transmitted from the first node to the load balancer and/or the task assignment system.

At step 506, a request to process a task can be sent, provided, transmitted, and/or the like to the first node based on the operational status of the first node. As an example, the task assignment element 117 of the computing device 104 (e.g., a load balancer) and/or a task assignment system can determine a task based on the operational status of the first node. The task assignment system and/or the load balancer can provide a request to process the task to the first node. As a specific example, the request to process a task can comprise routing one or more data blocks. The request can be processed at the first node. In another aspect, the computing device 104 and/or the task assignment system can refrain from transmitting requests to fulfill a task to the first node in the event the first node has an operational status that is insufficient to ensure task completion.

In an aspect, the methods 300, 400, and 500 can be implemented in a variety of systems, such as network routing, content services, computer processing, and/or the like. For example, the methods 300, 400, and 500 can be implemented to process a plurality of requests in a content management system. Example requests can comprise requests to encode, deliver, encrypt, edit, and/or the like various content (e.g., audio, video, text, application). The methods 300, 400, and 500 can be used to implement a cloud computing environment, server pool, and/or the like configured to provide access to various content. The nodes described herein can comprise servers (e.g., virtual servers, content servers), routers, encoders, modulators, processing units (e.g., nodes of a distributed computing system), and/or the like.

As an illustration, the load balancing system can comprise a network load balancer configured to route network traffic based on feedback received from routers. The network load balancer can query a router to determine if the network load balancer should continue to send traffic to the router. In an aspect, a router can determine a failure rate associated with traffic directed through the router. In an aspect, each router can forward the determined failure rate to the other peer routers, as well as receiving the determined failure rates from the other peer routers. If a first router determines that the determined failure rate of the first router is unacceptable relative to the failure rate of the peer routers of the first router, then the first router can determine that the first router is not available. In an aspect, if/when the network load balancer sends a query to the first router, the first router can respond that the first router is not available. In an aspect, the network load balancer can ignore the first router in routing network traffic.

In an aspect, the steps of the methods 300, 400, and 500 can be performed by one device or multiple devices. For example, the device can comprise the first node, second node, a third node, the load balancer, and/or the like. As another example, one or more of the steps can be performed by a node (e.g., first node, second node, third node) or the load balancer while other steps can be performed by other nodes. In some implementations, a node (e.g., first node, second node, third node) can act as a load balancer.

Figure 6:
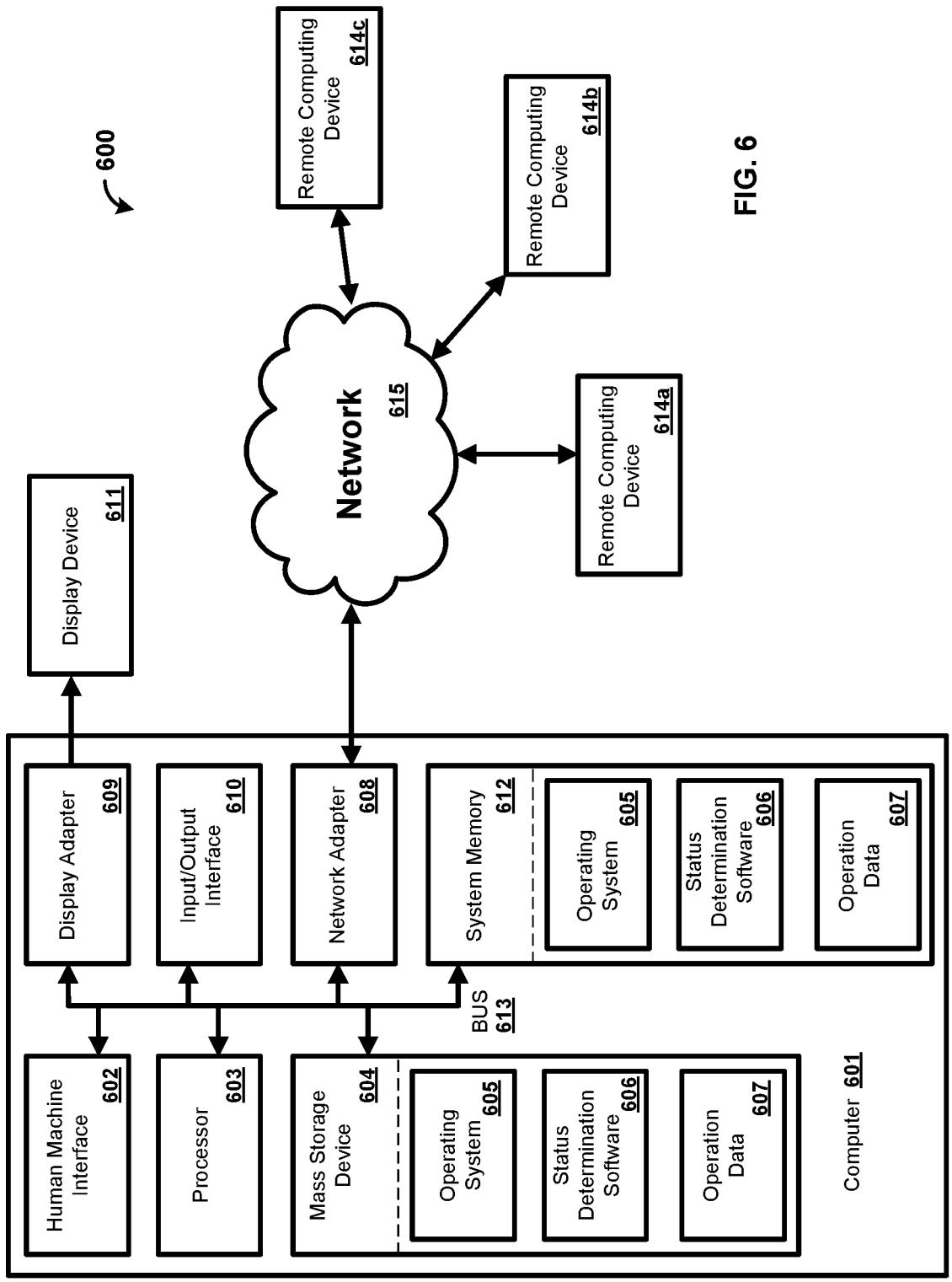
FIG. 6 is a block diagram illustrating an example computing device in which the present methods and systems can operate.

FIG. 6 is a block diagram illustrating an exemplary operating environment 600 for performing the disclosed methods. In an exemplary aspect, the methods and systems of the present disclosure can be implemented on computer 601 as illustrated in FIG. 6 and described below. By way of example, the first node 102a and the computing device 104 in FIG. 2 can be the computer 601 as illustrated in FIG. 6. Similarly, the methods and systems disclosed can utilize one or more computing devices to perform one or more functions in one or more locations. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors 603, a system memory 612, and a system bus 613 that couples various system components including one or more processors 603 to the system memory 612. In an aspect, the system can utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The system bus 613, and all buses specified in this description can also be implemented over a wired or wireless network connection and each of the subsystems, including the one or more processors 603, a mass storage device 604, an operating system 605, status determination software 606, operation data 607, a network adapter 608, the system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data, such as the operation data 607, and/or program modules, such as the operating system 605 and the status determination software 606, that are immediately accessible to and/or are presently operated on by the one or more processors 603.

In another aspect, the computer 601 can also comprise other removable/non-removable, volatile/non-volatile computer storage media. By way of example, FIG. 6 illustrates a mass storage device 604 which can provide non-volatile storage of computer code, computer readable instructions, data structures, program modules, and other data for the computer 601. For example and not meant to be limiting, the mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, the operating system 605 and the status determination software 606. Each of the operating system 605 and the status determination software 606 (or some combination thereof) can comprise elements of the programming and the status determination software 606. The operation data 607 can also be stored on the mass storage device 604. The operation data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 601 via an input device (not shown). Examples of such input devices comprise, but are not limited to, a keyboard, pointing device (e.g., a "mouse"), a microphone, a joystick, a scanner, tactile input devices, such as gloves, and other body coverings, and the like. These and other input devices can be connected to the one or more processors 603 via a human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, a display device 611 can also be connected to the system bus 613 via an interface, such as a display adapter 609. It is contemplated that the computer 601 can have more than one display adapter 609 and the computer 601 can have more than one display device 611. For example, a display device can be a monitor, an LCD (Liquid Crystal Display), or a projector. In addition to the display device 611, other output peripheral devices can comprise components, such as speakers (not shown) and a printer (not shown), which can be connected to the computer 601 via the Input/Output Interface 610. Any step and/or result of the methods can be output in any form to an output device. Such output can be any form of visual representation, including, but not limited to, textual, graphical, animation, audio, tactile, and the like. The display device 611 and the computer 601 can be part of one device, or separate devices.

The computer 601 can operate in a networked environment using logical connections to the one or more remote computing devices 614a,b,c. By way of example, a remote computing device can be a personal computer, portable computer, smartphone, a server, a router, a network computer, a peer device or other common network node, and so on. Logical connections between the computer 601 and the remote computing device 614a,b,c can be made via a network 615, such as a local area network (LAN) and/or a general wide area network (WAN). Such network connections can be through the network adapter 608. The network adapter 608 can be implemented in both wired and wireless environments. Such networking environments are conventional and commonplace in dwellings, offices, enterprise-wide computer networks, intranets, and the Internet.

For purposes of illustration, application programs and other executable program components, such as the operating system 605 are illustrated herein as discrete blocks, although it is recognized that such programs and components reside at various times in different storage components of the computer 601, and are executed by the data processor(s) of the computer. An implementation of the status determination software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   determining, by a first network device of a plurality of network devices, an operational status of a second network device of the plurality of network devices relative to the first network device;
   determining, based on the operational status and based on a failure rate of the second network device, that the second network device is to process at least one computing task; and
   causing the second network device to process the at least one computing task.

2. The method of claim 1, further comprising:
   determining, based on a failure rate of the first network device and the failure rate of the second network device, a failure status of the second network device relative to the first network device, wherein determining that the second network device is to process the at least one computing task is further based on the failure status of the second network device.

3. The method of claim 1, wherein the failure rate of the second network device is based on at least one of a rate of failing to fulfill requests, an error rate, or a rate of failed operations.

4. The method of claim 1, wherein the failure rate of the second network device is based on a ratio of failed requests with respect to fulfilled requests.

5. The method of claim 1, wherein the failure rate of the second network device indicates an availability of the second network device when the failure rate does not satisfy a threshold.

6. The method of claim 1, wherein the failure rate of the second network device is based on a completion of one or more computing tasks associated with the at least one computing task.

7. The method of claim 1, wherein causing the second network device to process the at least one computing task further comprises:
   determining that the operational status of the second network device is active; and
   determining that the failure rate of the second network device does not satisfy a threshold.

8. A non-transitory computer readable medium storing processor-executable instructions that, when executed by a first network device of a plurality of network devices, cause the first network device to:

determine an operational status of a second network device of the plurality of network devices relative to the first network device;

determine, based on the operational status and based on a failure rate of the second network device, that the second network device is to process at least one computing task; and cause the second network device to process the at least one computing task.

9. The non-transitory computer readable medium of claim 8, wherein the processor-executable instructions further cause the first network device to:

determine, based on a failure rate of the first network device and the failure rate of the second network device, a failure status of the second network device relative to the first network device, wherein determining that the second network device is to process the at least one computing task is further based on the failure status of the second network device.

10. The non-transitory computer readable medium of claim 8, wherein the failure rate of the second network device is based on at least one of a rate of failing to fulfill requests, an error rate, or a rate of failed operations.

11. The non-transitory computer readable medium of claim 8, wherein the failure rate of the second network device is based on a ratio of failed requests with respect to fulfilled requests.

12. The non-transitory computer readable medium of claim 8, wherein the failure rate of the second network device indicates an availability of the second network device when the failure rate does not satisfy a threshold.

13. The non-transitory computer readable medium of claim 8, wherein the failure rate of the second network device is based on a completion of one or more computing tasks associated with the at least one computing task.

14. The non-transitory computer readable medium of claim 8, wherein the processor-executable instructions that cause the first network device to cause the second network device to process the at least one computing task further cause the first network device to:

determine that the operational status of the second network device is active; and determine that the failure rate of the second network device does not satisfy a threshold.

15. An apparatus, comprising:

one or more processors; and a memory storing processor-executable instructions that, when executed by the one or more processors, cause the apparatus to:

determine, an operational status of a network device of a plurality of network devices relative to the apparatus;

determine, based on the operational status and based on a failure rate of the network device, that the network device is to process at least one computing task; and cause the network device to process the at least one computing task.

16. The apparatus of claim 15, wherein the processor-executable instructions further cause the apparatus to:

determine, based on a failure rate of the apparatus and the failure rate of the network device, a failure status of the network device relative to the apparatus, wherein determining that the network device is to process the at least one computing task is further based on the failure status.

17. The apparatus of claim 15, wherein the failure rate of the network device is based on at least one of a rate of failing to fulfill requests, an error rate, or a rate of failed operations.

18. The apparatus of claim 15, wherein the failure rate of the network device is based on a ratio of failed requests with respect to fulfilled requests.

19. The apparatus of claim 15, wherein the failure rate of the network device indicates an availability of the network device when the failure rate does not satisfy a threshold.

20. The apparatus of claim 15, wherein the failure rate of the network device is based on a completion of one or more computing tasks associated with the at least one computing task.

* * * * *